US012548276B2

(12) United States Patent
Bustany et al.

(10) Patent No.: US 12,548,276 B2
(45) Date of Patent: Feb. 10, 2026

(54) MAPPING FASCIAL THERAPEUTIC LOCATIONS ONTO A PATIENT BODY IMAGE

(71) Applicant: PhysioHand, Inc., San Carlos, CA (US)

(72) Inventors: Ismail Bustany, San Carlos, CA (US); Tala Khalaf, San Carlos, CA (US)

(73) Assignee: PhysioHand, Inc., San Carlos, CA (US)

( * ) Notice: Subject to any disclaimer, the term of this patent is extended or adjusted under 35 U.S.C. 154(b) by 136 days.

(21) Appl. No.: 18/695,796

(22) PCT Filed: Sep. 30, 2022

(86) PCT No.: PCT/US2022/045455
§ 371 (c)(1),
(2) Date: Mar. 26, 2024

(87) PCT Pub. No.: WO2023/056064
PCT Pub. Date: Apr. 6, 2023

(65) Prior Publication Data
US 2025/0131672 A1   Apr. 24, 2025

Related U.S. Application Data

(60) Provisional application No. 63/250,843, filed on Sep. 30, 2021.

(51) Int. Cl.
*G06T 19/20* (2011.01)
*G06T 17/20* (2006.01)
*G16H 20/30* (2018.01)

(52) U.S. Cl.
CPC .............. *G06T 19/20* (2013.01); *G06T 17/20* (2013.01); *G16H 20/30* (2018.01); *G06T 2210/41* (2013.01); *G06T 2219/2021* (2013.01)

(58) Field of Classification Search
CPC ..... G06T 19/20; G06T 17/20; G06T 2210/41; G06T 2219/2021; G16H 20/30
See application file for complete search history.

(56) References Cited

U.S. PATENT DOCUMENTS

2018/0161101 A1   6/2018   Barsoum et al.
2018/0256092 A1   9/2018   Obma et al.
(Continued)

FOREIGN PATENT DOCUMENTS

CN   101958079   1/2011

OTHER PUBLICATIONS

Lan et al., "The Application of 3D Morphable Model (3DMM) for Real-Time Visualization of Acupoints on a Smartphone," (2020) IEEE Sensors Journal 21(3):3289-3300.
(Continued)

*Primary Examiner* — Xin Sheng
(74) *Attorney, Agent, or Firm* — Haynes and Boone, LLP

(57) ABSTRACT

A three-dimensional (3D) digital image of an individual patient marked with target therapeutic locations on a skin surface of the patient is used for locating those treatment locations on a patient's skin for fascial manipulation and other treatments. The 3D image may be obtained by merging an unmarked 3D digital patient model image converted from a 2D optical image with a "generic" musculoskeletal digital model having optimized target therapeutic locations distributed over a skin surface thereof. The generic musculoskeletal digital model may be obtained from a library of such images.

20 Claims, 8 Drawing Sheets

(56) References Cited

U.S. PATENT DOCUMENTS

| | | | |
|---|---|---|---|
| 2019/0343717 A1* | 11/2019 | Yim | A61B 5/004 |
| 2020/0126297 A1* | 4/2020 | Tian | G06T 7/0012 |
| 2020/0323649 A1* | 10/2020 | Schipper | A61B 34/10 |
| 2020/0330315 A1 | 10/2020 | Khalaf et al. | |

OTHER PUBLICATIONS

Saito et al., "PIFu: Pixel-Aligned Implicit Function for High-resolution Clothed Human Digitization," (2019) Proceedings of the IEEE/CVF international conference on computer vision, pp. 2304-2314.

Jackson et al., "3D Human Body Reconstruction from a Single Image via Volumetric Regression," (2018) Proceedings of the European Conference on Computer Vision, pp. 1-14.

Zheng et al., "DeepHuman: 3D Human Reconstruction from a Single Image," (2019) Proceedings of the IEEE/CVF International Conference on Computer Vision, pp. 7739-7749.

Li et al., "Self-correction for Human Parsing," (2019) Cornell University, Computer Science, Computer Vision and Pattern Recognition, pp. 1-9.

Zhu et al., "Detailed human shape estimation from a single image by hierarchical mesh deformation," (2019) Proceedings of the IEEE/CVF International Conference on Computer Vision, pp. 4491-4500.

Anguelov et al., "SCAPE: Shape Completion and Animation of People," (2005) ACM Transactions on Graphics 24:408-416.

* cited by examiner

MAPPING FASCIAL THERAPEUTIC LOCATIONS ONTO A PATIENT BODY IMAGE

This application claims the benefit of U.S. Provisional No. 63/250,843, filed Sep. 30, 2021, the entire content of which is incorporated herein.

BACKGROUND OF THE INVENTION

1. Field of the Invention

The present application relates to medical imaging and treatment. More particularly, the present invention relates to methods for virtually marking treatment locations on a three-dimensional mesh or other model of a patient's skin.

Fascial Manipulation is a method for treating pain and involves deep manual friction over specific sites on the deep muscular fascia that are typically located at a distance from the site where the patient experiences pain. Experienced therapists learn where the treatment sites for particular forms of pain are located and can treat accordingly. There are also maps available showing treatment sites associated with different types of pain on images of a generic human body. While a help, it can be difficult for therapists to accurately locate those generic sites on a real patient's body, particularly if the patient's gender, age or body type differs significantly from the generic body.

For these reasons, it would be desirable to provide methods and aids for assisting therapists in locating target treatment locations on individual patients when performing fascial manipulation and other body surface treatments, such as acupuncture. It would be particularly desirable to provide methods and aids which provide images of the patient being treated which have the treatment locations accurately mapped thereon. At least some of these objectives will be met by the inventions described and claimed herein.

2. Description of the Background Art

US2020/0330315, commonly owned with the present application, describes methods for fascial manipulation of target locations on a patient's deep fascia via the skin.

SUMMARY OF THE INVENTION

The present invention provides three-dimensional (3D) digital image of individual patients marked with target therapeutic locations on a skin surface of the patient. The 3D digital images are useful for locating those treatment locations on the individual patient's skin for fascial manipulation and other treatments. The marked patient 3D image may be obtained by merging an unmarked 3D digital image, typically converted from a 2D optical image of the patient, with a "generic" musculoskeletal digital model having optimized target therapeutic locations distributed over a skin surface thereof. The generic musculoskeletal digital model may be obtained from a library of such images.

Exemplary target treatment locations include, for example, fascia center of coordination points, fascia center of fusion, acupuncture points, trigger points, and the like. In addition to displaying the marked images to therapists for real time positioning during therapy, the methods and aids of the present invention may be used for augmented reality visualization of these treatment locations onto the patient's body thereby to further aid a clinician in accurately treating these target locations. Patient evaluation and assessment metrics may also be tabulated.

In a first aspect, the present invention provides a method for generating three-dimensional (3D) image of an individual patient marked with target therapeutic locations on a skin surface of the patient. The method comprises providing a "template" musculoskeletal model having the target therapeutic locations distributed over a skin surface thereof. The template model maybe any generic image of a human body and will typically be shown in a specific canonical position. Usually, a library of the template musculoskeletal models will be provided, where the library includes individual generic images of human bodies of each gender and different ages, body types, tend to like. While subject to changing and updating from time to time, the library will generally remain constant and be available to a therapist or other user when working with a number of different individual patients over time.

An "individual" patient 3D musculoskeletal model of a particular patient to be treated is also obtained. Typically, the therapist or other user we'll take a 2D optical full body image of the patient, for example using a smart phone or other digital camera or instrument and convert the image to 3D using software which may be loaded on the smartphone or other instrument taking the 2D image.

The template musculoskeletal 3D digital model is then merged with the individual patient digital 3D musculoskeletal model to produce the 3D image of an individual patient marked with the therapeutic locations on the skin surface. Specific protocols for merging the two models may be performed on the smartphone or other digital instrument and are described in more detail hereinafter, and those images may be displayed on the smartphone or other instrument for reference by the therapist when performing a procedure.

The target therapeutic locations will usually have been subjectively marked on the digital 3D model by experts, but in some instances may be automatically marked on the digital 3D template musculoskeletal model in accordance with rules.

Merging typically comprises deforming the digital 3D template musculoskeletal model to match the shape of the patient 3D musculoskeletal model to produce the three-dimensional image of the individual patient marked with the therapeutic locations on the skin surface. Usually, the digital 3D template musculoskeletal model and the individual patient 3D musculoskeletal model each comprise a 3D mesh model. For example, the 3D mesh model may comprise a plurality of finite elements, typically finite elements comprising $n_v$ vertices and $n_m$ mesh elements. Usually, deforming comprises deforming each element of the 3D mesh.

The target therapeutic locations may comprise any of fascia center of coordination points, fascia center of fusion points, acupuncture points, and trigger points, or any acupuncture or other therapeutic skin surface location.

In a second aspect, the present invention provides methods for fascial manipulation. Such methods comprise displaying an image of the individual patient 3D musculoskeletal model of the individual patient produced as descried above and manipulating the patient's fascia at target locations on the displayed image. Such methods may further comprise marking indicia on the patient's skin surface corresponding to the target locations shown on the displayed image prior to manipulating the target locations.

In a third aspect, the present invention provides a library of digital musculoskeletal template models having target therapeutic locations distributed over a skin surface thereof, wherein individual ones of the models in the library represent different patient types. The patient types may differ in one or more of gender, age, and body type, and the target therapeutic locations may comprise fascial manipulation targets, such as fascia center of coordination points, fascia center of fusion points, acupuncture points, and trigger points.

In specific instances, the digital musculoskeletal template models in the library each comprise a 3D mesh model. For example, each 3D mesh model may comprise a plurality of finite elements and each 3D mesh model may comprise $n_v$ vertices and $n_m$ mesh elements.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION OF THE INVENTION

Figure 1A:
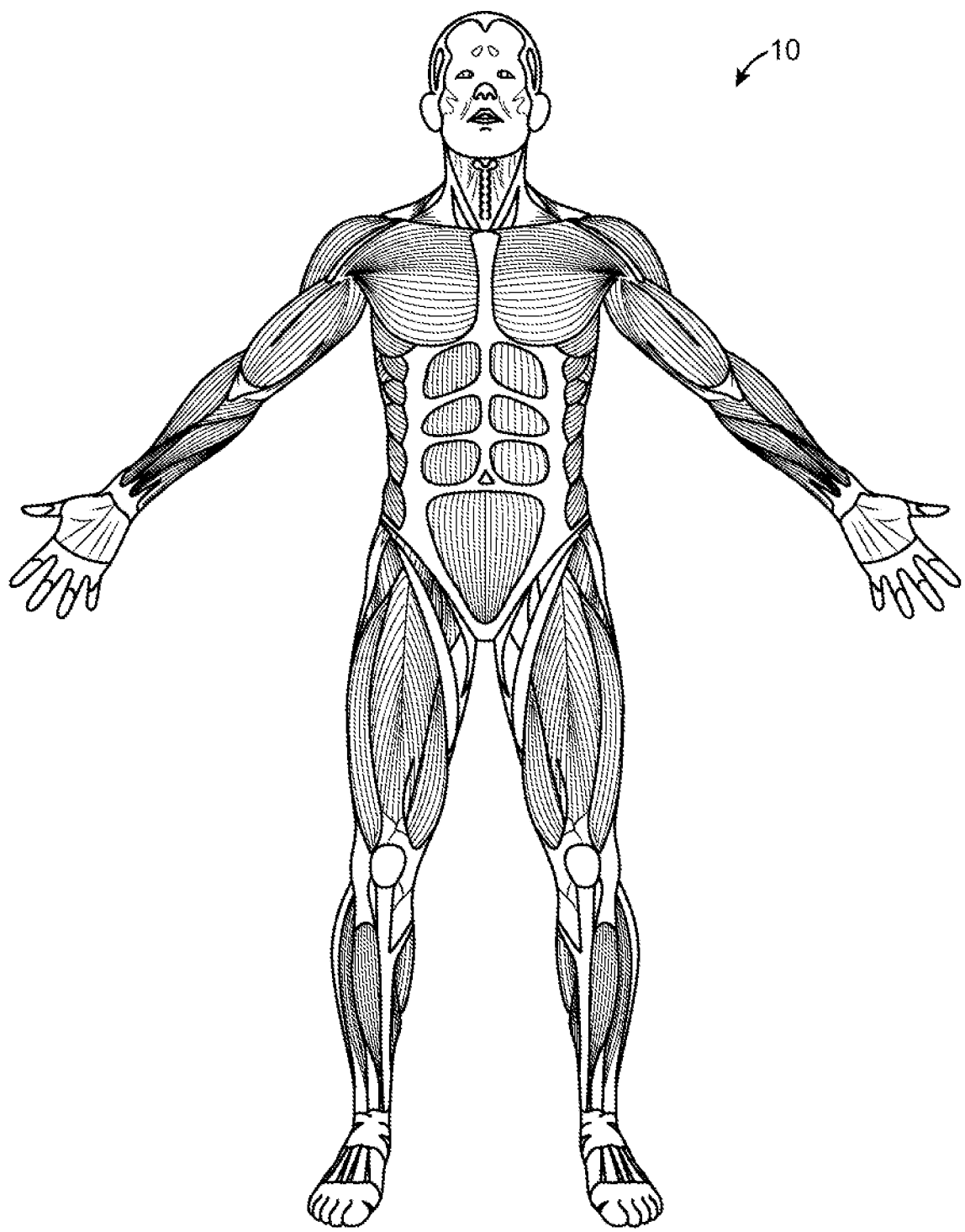
FIG. 1A shows a template nongender specific manipulable 3D model of the human body.
Figure 1B:
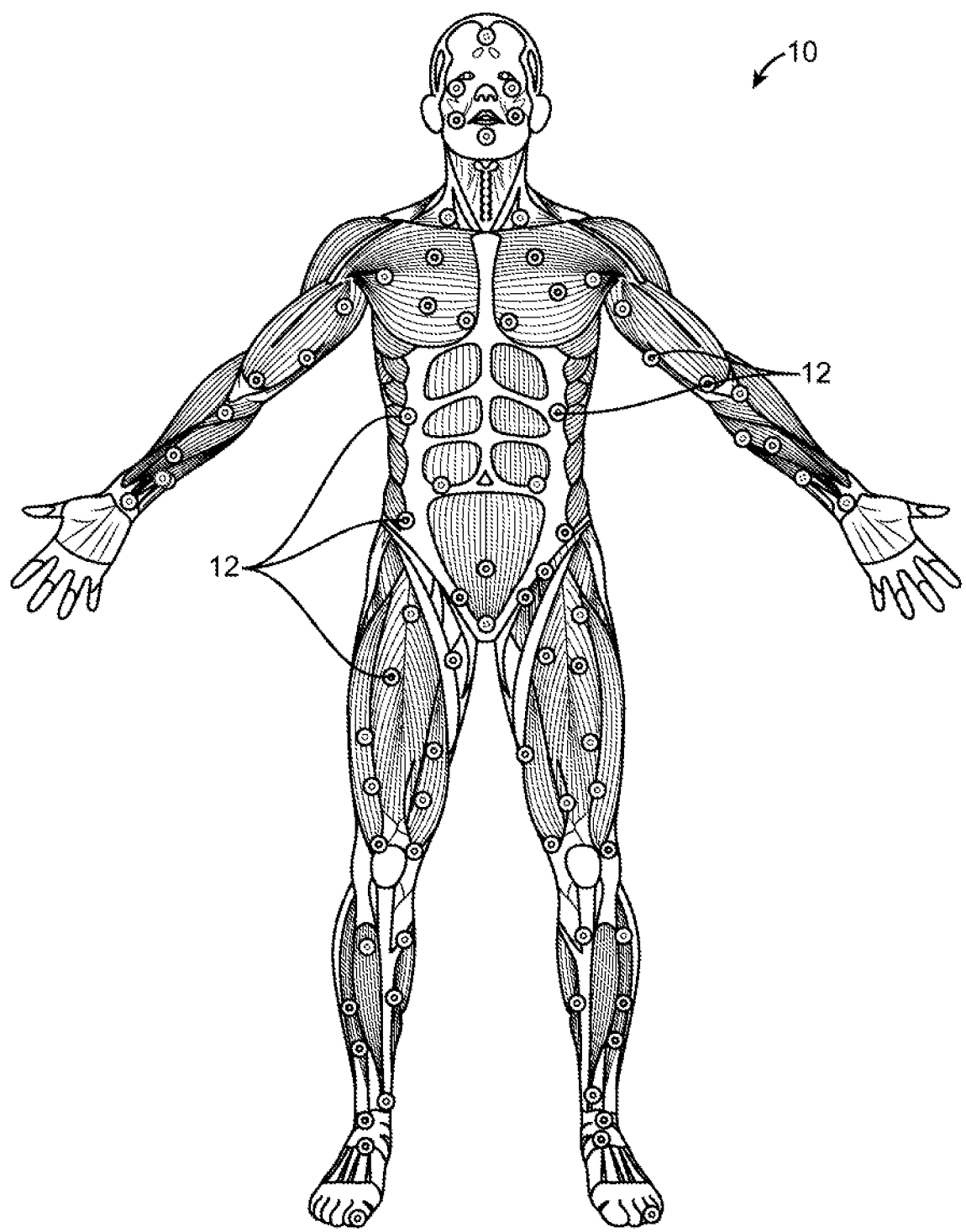
FIG. 1B shows locations of anatomically mapped target treatment points along various fascia lines.
Figure 1C:
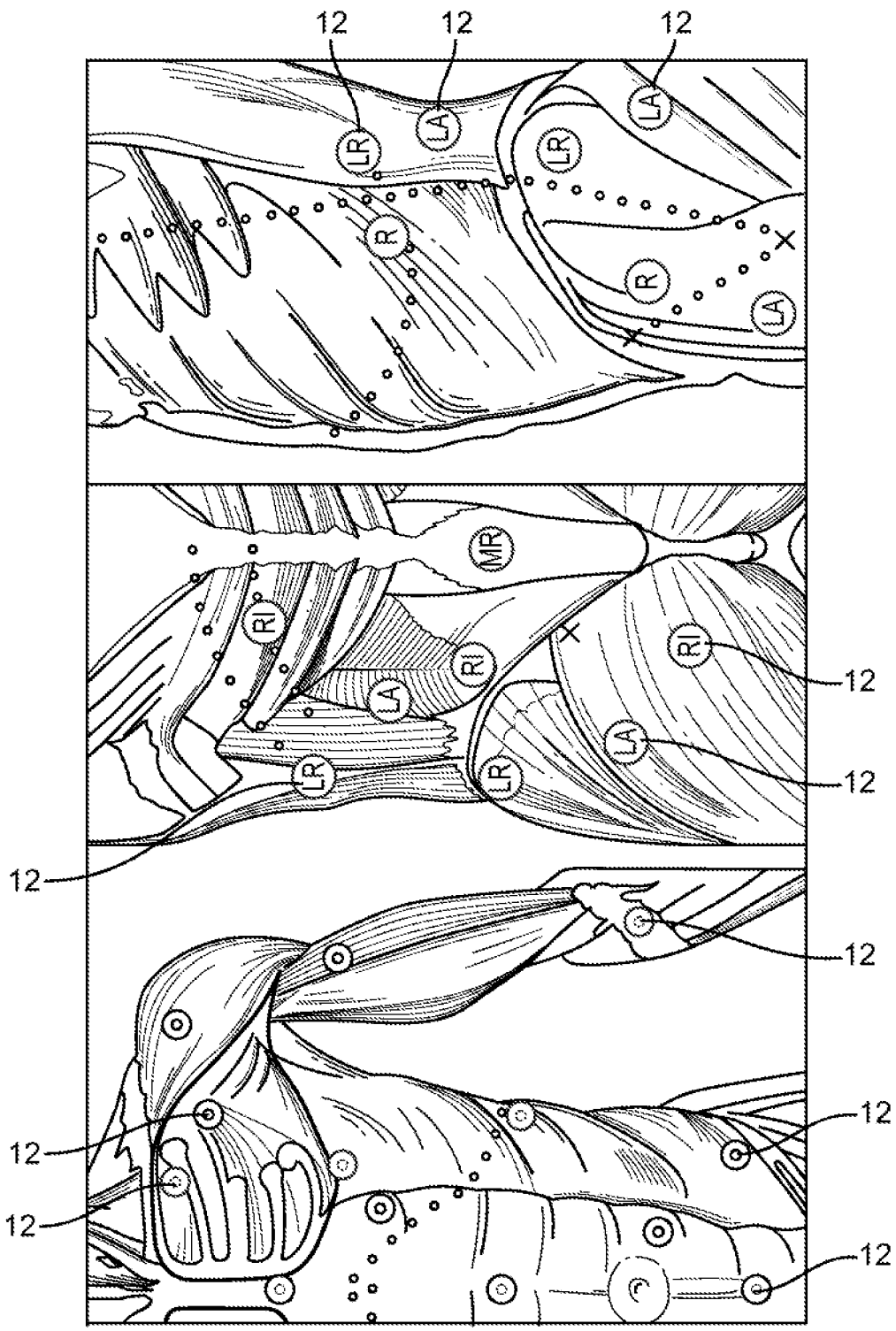
FIG. 1C shows different views of the mapped fascia target treatment points.

Referring to FIGS. 1A to 1C, the methods of the present invention rely on the creation of digital 3D (three-dimensional) template musculoskeletal model having a plurality target therapeutic locations distributed over a skin surface thereof. Such libraries are created from individual digital 3D musculoskeletal models 10, as shown for example, in FIG. 1A, which represent specific patient types or "paradigms" classified based on gender, age, body type. Such digital 3D templates will typically be 3D mesh models and may be obtained from available sources and databases but will usually be created from 2D (two-dimensional) optical images of living, human bodies of the desired demographic type, as described in more detail below.

Once the digital 3D template musculoskeletal models 10 are obtained or created, they will be marked or annotated with target treatment points 12 (e.g., fascia centers of coordination, acupuncture points, trigger points, etc.) as shown FIG. 1B and 1C which show locations of anatomically mapped target treatment points along various fascial lines. The annotated template human 3D mesh model of FIG. 1B will be transformed (or deformed) to a patient-specific mesh models to aid in treatment mapping as discussed below. While likely being updated from time to time, the generic or paradigm versions of the template human 3D mesh models which comprise the library are intended to be used with multiple specific patients over time.

Figure 2A:
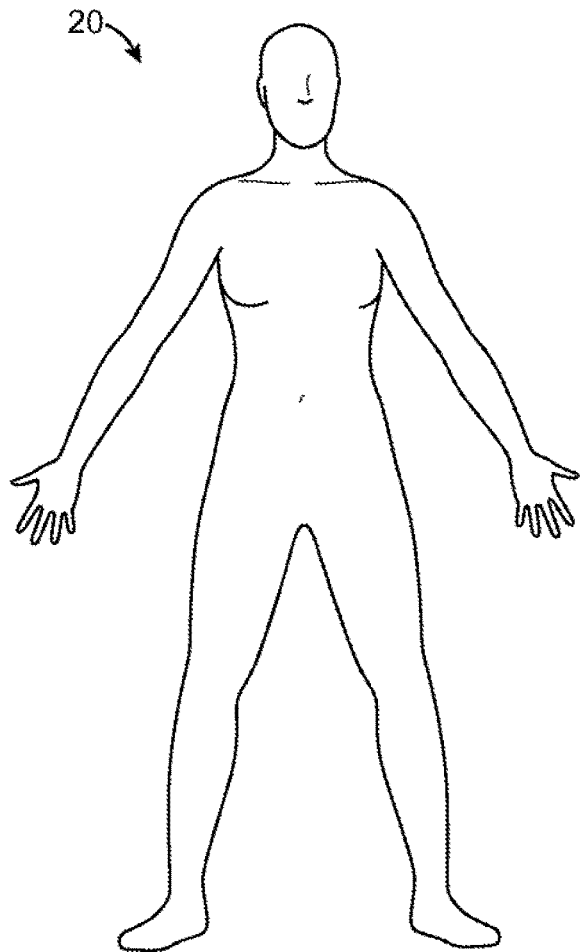
FIG. 2A shows a 3D model of patient reconstructed from a picture.
Figure 2B:
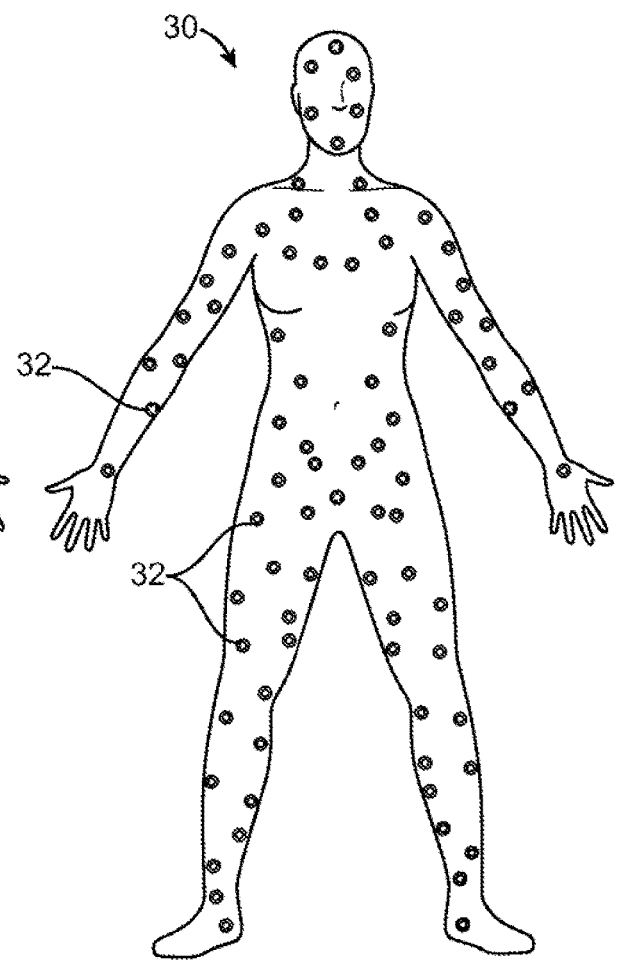
FIG. 2B shows locations of anatomically target treatment points along various fascia lines mapped onto the patient's body model.

Referring to FIGS. 2A and 2B, a digital three-dimensional (3D) image of an individual patient 30 marked with target therapeutic locations 32 on a skin surface of the patient may be created by taking or acquiring one or more "depth-of-field" images of the individual patient's body, for example using a smart phone or other digital camera (e.g. an iPhone® device or an Android® device).

The optical images of the patient can be converted to digital 3D images using known image processing protocols, for example as described by Saito et al. 2019, *PIFu: Pixel-Aligned Implicit Function for High-Resolution Clothed Human Digitization*. A 3D mesh model including hands, face, and body is obtained from a single image using, for example, SMPL-X or SMPLifyX: Expressive body capture (Max-Planck-Gesellscaft) relying on Open Pose detection (Jackson et al. 2018 *3D Human Body Reconstruction from a Single Image via Volumetric Regression*) or the DeepHuman framework (Zheng et al. 2019 DeepHuman: 3D Human Reconstruction from a Single Image). The 3D model is segmented into anatomical parts (e.g. eyes, ears, finger tips, toes, thighs, knees, elbows, wrists, etc.) using, for example, the techniques of Li 2019, *Self-Correction for Human Parsing*.

After the patient 3D models are obtained, predetermined "calibration" markers for the segmented anatomical features are added, and the 3D image of body frame is transformed into a "canonical" posture, for example, with the patient standing tall, with the feet parallel and hip-width apart. The arms are extended alongside the body with shoulders drawn back towards the spine and palms turned forward. The treatment points are added to the model in its canonical posture and the 3D model into a common 3D model format (e.g. .max or .obj).

Referring to FIG. 2B, target treatment points from the generic 3D template mesh model may be mapped onto the patient's 3D mesh model of FIG. 2A by loading the generic 3D template model and the individual 3D patient model into a suitable image processing program or application. Both models are transformed into canonical postures, as needed, and the patient model is segmented into the anatomical parts. Predetermined calibration markers are added to the segmented anatomical features with markers matched on both on models. For example, the template markers may be morphed or transformed from the generic 3D mesh model to the patient's 3D mesh model, for example, using a nonlinear 3D morphable model based on SMPL-X or SMPLify X: Expressive body capture (Max-Planck-Gesellscaft). The morphed template mesh model may be saved as the patient's individualized mesh model.

Optionally, an augmented reality-based application program may be interface to visualize the mapped target treatment points from the 3D patient model onto the patient's actual body may be built. Such an application program allows the user to transform and align the 3D patient model with the patient and thereby superimpose, in real time, the target treatment points onto the patient's body when viewed through application program interface. Some or all of the target treatment points will be annotated with a precise anatomical location in the body and that can be visualized through the application program.

Such an application program may also suggest candidate target point(s) to treat based on presented symptoms. For example, treatment of the CC: Retro CP3 is associated with headache symptom and treatment of the CF: Retro lateral pelvi 1 and 2 and retro lateral coxa is associated sciatica.

Such an application program may also be configured to aid the clinician in monitoring patient progress and in evaluating and recording a history of pre- and post-assessment of range of motion, strength test, coordination/balance, functional movement, and patient's pain level.

EXAMPLE

Program applications suitable for implementation on commercially available mobile operating systems, such as Apple's iOS and Google's Android App, are prepared as follows.

Figure 4:
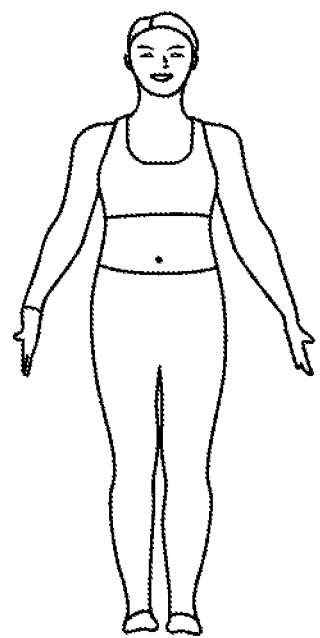
FIG. 4 is a frontal image of a patient standing in the mountain pose position taken with an digital optical camera, such as a smart phone camera. The digital 3D mesh models produced from such optical images will be generated in the "canonical pose," typically with open, stretched hands and toes as target treatment locations will be present on the hands and toes.

1. Create a Library of Segmented Template 3D Mesh Models With Target Treatment Points STEP 1: A generic digital 3D template mesh model is created by first capturing or otherwise obtaining a digital 2D image of a human subject in the desired demographic (e.g. gender, age, body type), typically using a digital camera. The subject should be posing in a desired canonical, such as the "mountain pose" used in Yoga, as shown for example in FIG. 4. Other poses can be chosen as long as all the body parts are shown. The human subject should be wearing a tight-fitting bodysuit (e.g., a yoga body outfit). In some instances, a frontal image of the subject in the mountain pose may be obtained. The digital 3D image(s) is/are then converted to a 3D mesh model. For example, this can be done using the software programs described previously. Each generic digital 3D mesh model is tuned to have a priori fixed number of $n_v$ vertices and $n_m$ mesh elements.

A library of such generic template 3D mesh models is prepared as above, with one generic template 3D mesh model for each unique combination of (1) gender (female/male), (2) age groups (e.g. 0-5, 6-10, 11-15, 16-20, 21-30, 31-50, 51-70, 71-100), and optionally (3) body type or other characteristic of a patient population. All the generated template 3D mesh models will have the same fixed number of $n_v$ vertices and $n_m$ mesh elements.

Figure 3:
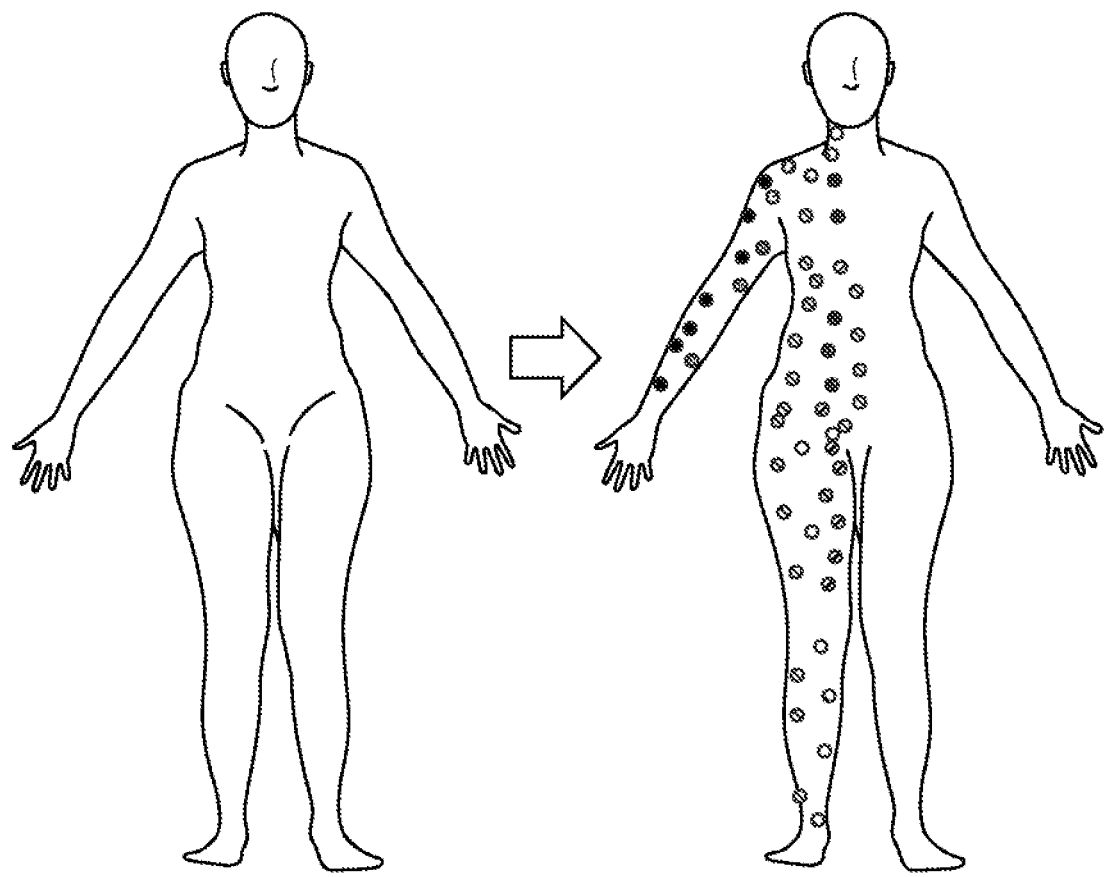
FIG. 3 illustrates a partial target treatment point registration on a template 3D mesh human body model. The treatment points belonging to the same treatment group are encoded with the same color. The digital image to the left shows the template 3D mesh model with the generic body in a "canonical pose," such as the mountain pose position. The digital image to the right shows the target treatment points partially registered onto the template 3D mesh model. While the "mountain pose" has been illustrated as a suitable example, any other pose showing whole body, fingers, and toes exposed, could also be used.

STEP 2: The template 3D mesh models (image shown at the left in FIG. 3) are loaded into a commercially available modelling program, such as Unity Pro, available from Unity Technologies. 3D objects, such as spherical objects are created to represent target treatment points. The 3D objects are anatomically registered at each desired target treatment points, such as a CC point, CF point, trigger point, or the like, on the template 3D mesh model. The locations of the anatomically desired target treatment points are typically annotated on the template 3D mesh models an expert clinician/therapist (image shown at the right in FIG. 3). The coordinate locations of the registered points are expressed locally through the coordinate locations of the vertices of the mesh elements in which they are located. In addition to the coordinate locations, associated attributes may be registered the 3D objects, for example, it may be indicated that CC or CF points belonging to the same fascial line. All the 3D mesh models will show the fingers and toes as they are all modeled with mesh elements and will carry treatment points that must be observable.

Figure 5:
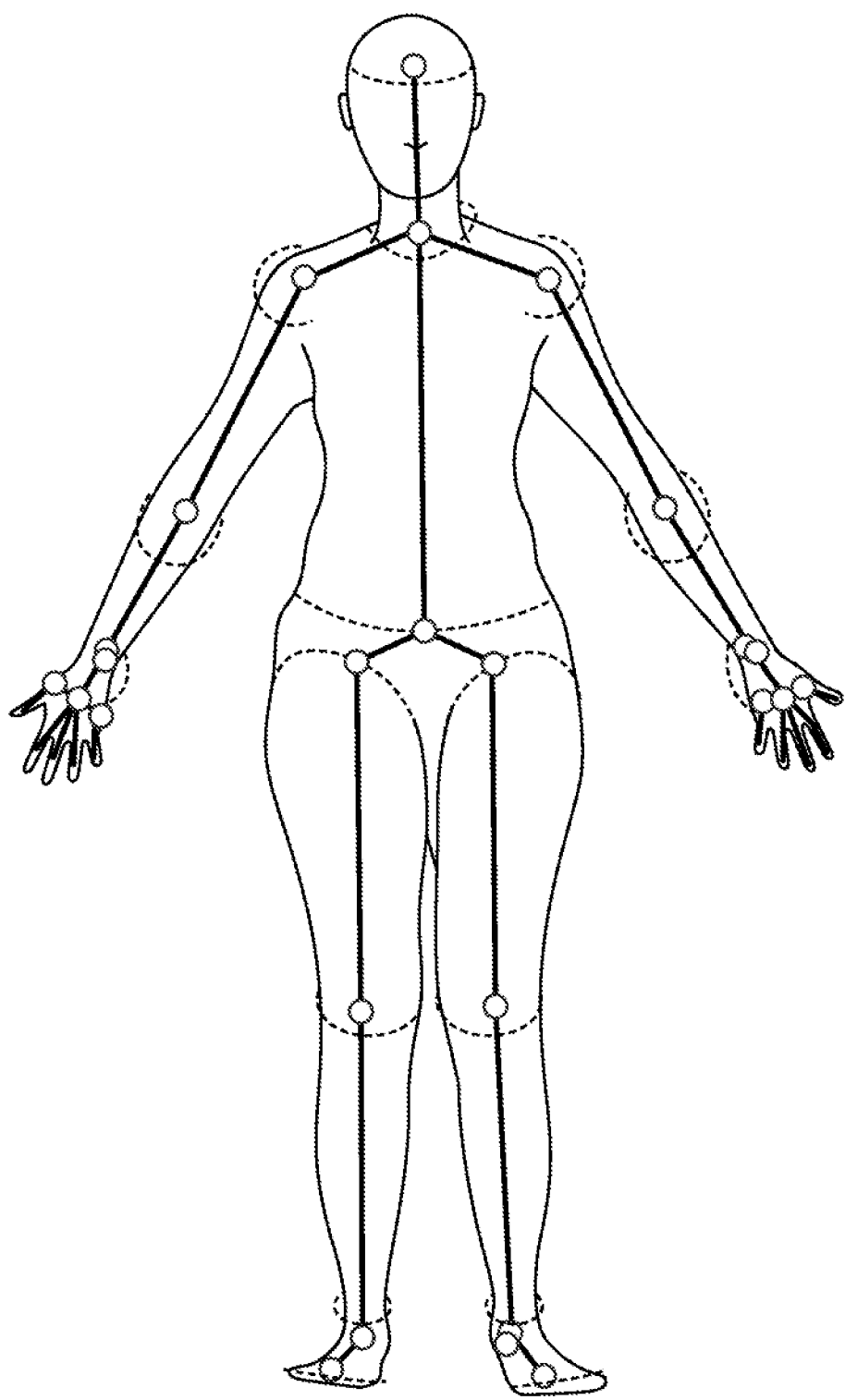
FIG. 5 illustrates segmented body parts according to virtual body joints (dots) and virtual body segments (lines).

STEP 3: Rigid body transformation is used to align the pose in the template 3D mesh model with that in in the patient's individual 3D mesh model with the that. Each 3D mesh model is segmented into body parts joined by virtual joint "handles." The body parts connected by these virtual joint handles represent the rigid body parts that will be translated and rotated for the purposes of alignment. Similar to the hierarchical mesh deformation (HMD) model described in Zhu et. al.: *Detailed human shape estimation from a single image by hierarchical mesh deformation*, Proceedings of the IEEE Conference on Computer Vision and Pattern Recognition (CVPR) (2019), joints are selected for the head crown, neck, waist, left/right shoulders, left/right elbows, left/right wrists, left/right finger joints, left/right hip joints, left/right knees, left/right ankles, and left/right toes. The virtual position for each joint is determined by the geometric mean of the set of vertices of the mesh model elements encircling each joint respectively. These virtual joints are then connected by virtual segments (FIG. 5). Rigid body motion transformations are applied to the virtual segments connecting these virtual joints, along with their respective segmented body parts, to align the pose of the subject's 3D mesh model to the template's 3D mesh model or vice versa.

More specifically, rigid body parts may be segmented for each template 3D mesh model as follows. A template 3D mesh model from the template 3D mesh model library is loaded into Unity Pro or other 3D modelling program. A set of vertices is labeled to form a ring around each body part of interest (FIG. 5). The vertex labels are used for all mesh models. For each ring, the respective virtual joint is determined by calculating the geometric (or arithmetic) means of all the vertex locations. Labels for the generated virtual joints are added, with the same labels used for all mesh models. Segments connecting these virtual joints are added and labeled, with the same labels used in all models. Virtual points and segments are ten added to the 3D mesh model. The original 3D mesh along with the virtual joint points and is then added to the template 3D mesh model library. These steps are repeated until all the template 3D mesh models have been segmented, saved, and the library is complete.

2. Create Individual Patient 3D Mesh Models With Target Treatment Points

STEP 4: Create a custom patient parametric 3D mesh model. A full body digital image of the patient is obtained with a smart phone, tablet, computer or other digital device. The digital image will preferably include depth and/or radiance field information). The patient will be in the mountain yoga pose (FIG. 4)) or other pose showing fingers and toes exposed. The patient be minimally dressed or dressed a tight-fitting body suit (e.g. yoga tight body outfit) so that the body features can be accurately captured. The patient's fingers and toes must be captured in the 2D image. In some instances, both a frontal image and a sagittal image may be taken.

The 2D image(s) is/are converted to an individual patient 3D mesh model as follows. The patient 2D image(s) is/are loaded into a 2D-image-to-3D-mesh-model converter tool to generate the patient 3D mesh model with N vertices and T mesh elements (e.g. triangles, quad2, or other 2D finite element shape types).

The 2D-image-to-3D-mesh-model convertor can be adapted from the detailed human shape estimation form a hierarchical mesh deformation (HMD) framework which generates 3D parametric mesh human body models from respective 2D images. HMD is preferred as it can easily control the size and model complexity. Other 2D-to-3D conversion programs (e.g. SMPL, PIFuHD, etc.) could also be adapted to effect the 2D to 3D mesh model conversion.

The generic template and custom patient 3D mesh models will be constructed to have the same number of $n_v$ vertices and $n_m$ mesh elements. This identity simplifies matching elements and transforming/deforming the template 3D mesh model into the patient's custom 3D mesh model and vice versa. Once the custom 3D mesh model is generated, the body parts are segmented as described in descried in Step 3.

The target treatment points are mapped onto the custom patient 3D mesh model in a two-step process. First, the custom 3D mesh model is transformed into the "canonical pose." Using a rigid body motion as described previously. Second, a non-rigid body shape transformation is used to deform the template 3D mesh model into the patient's custom 3D mesh model shape. See, Anguelov, et al. ACM transactions on graphics (TOG), Vol. 24, pages 408-416. ACM, 2005.

Translation invariant representations are used for the mesh element transformations to account for rigid body motion and non-rigid body deformations. Let mesh element sk contain the points xk, 1, xk,2, . . . , xk,q, k=1, . . . , nm (e.g. q=3 for a triangular mesh element). These transformations/deformations are obtained by translating point xk,1 to the global origin in the mesh element's local coordinate system, obtained. Such transformations/deformations will be applied to the mesh element's edges, ek, j=x k, j−x k, 1, j=2, . . . , q.

Figure 6:
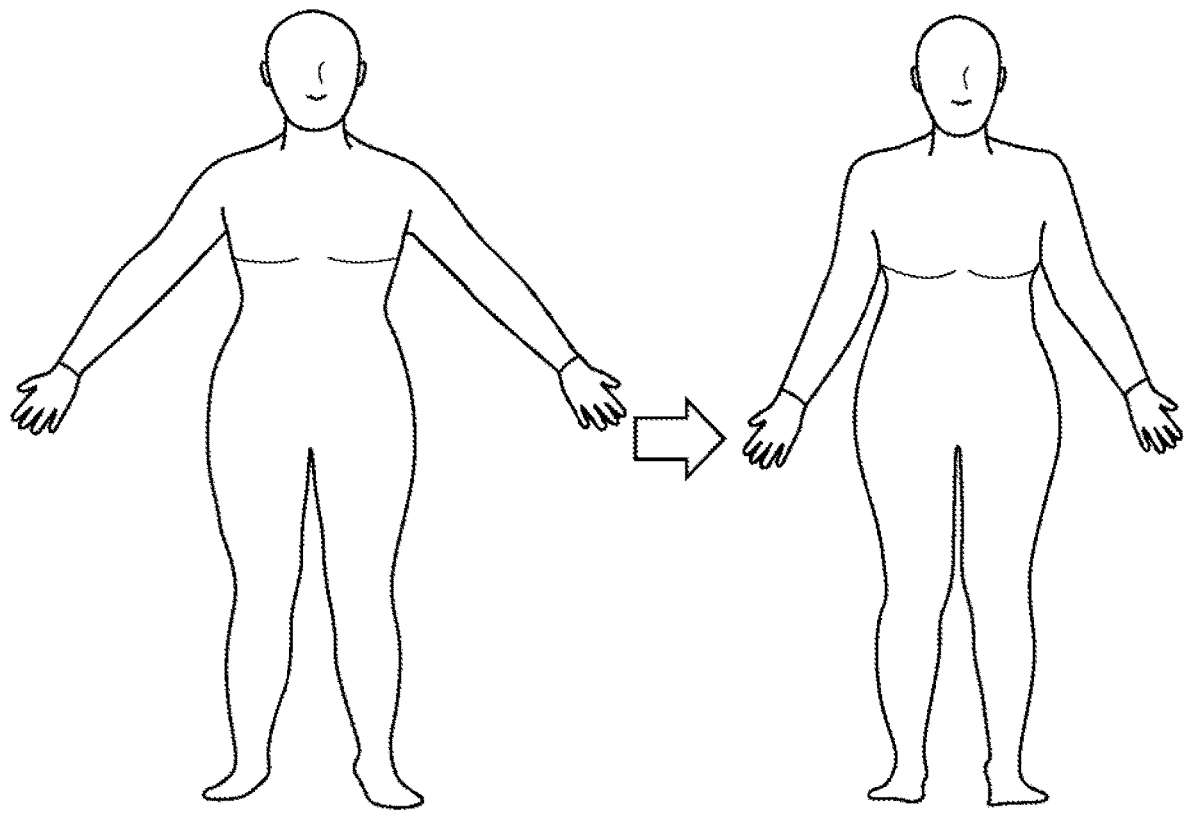
FIG. 6 illustrates transformation of the patient's custom 3D mesh model into the canonical pose through rigid body transformations applied to the joint handles. The left image shows the patient's generated custom 3D mesh model, and the right image shows the patient's custom 3D mesh model after transformation into the "canonical pose."

STEP 5: Transform the patient's custom 3D mesh model into the canonical pose. A template 3D mesh model appropriate for the individual patient is selected from the template 3D mesh model library based on the patient's gender, age group, and optionally other criteria. A rigid motion transformation (linear and rotational matrix transforms) is applied to each mesh element (e.g., triangular element) to transform the generated patient custom 3D mesh model into the "canonical pose." An approach similar to that described in Anguelov, et al. ACM transactions on graphics (TOG), Vol. 24, pages 408-416. ACM, 2005, may be applied to the joint handles. (See FIG. 6) as an illustration of such rigid body motion. The transformed patient custom 3D mesh model is saved as the custom patient model in the canonical pose.

Figure 7:
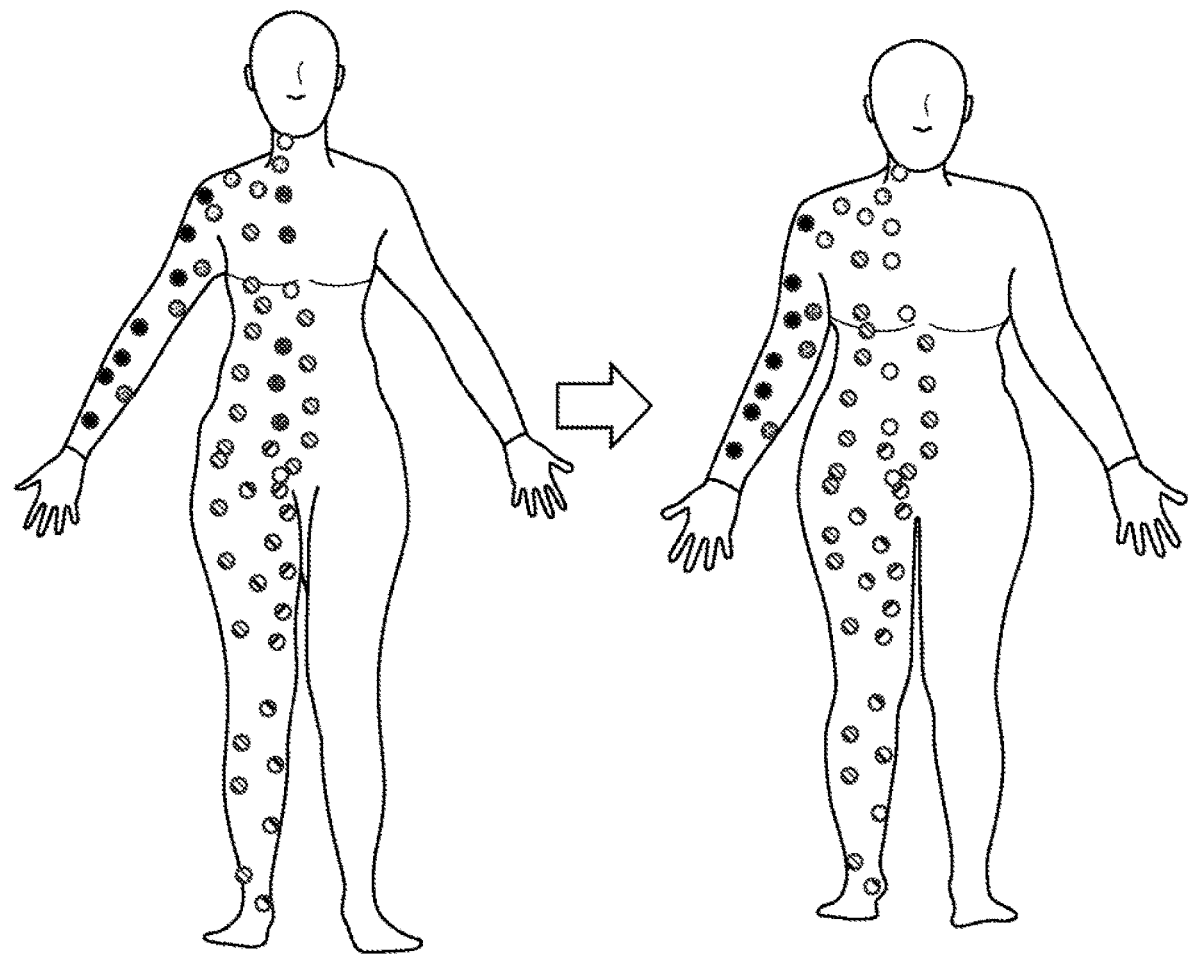
FIG. 7 illustrates deformation of the generic template 3D mesh model into the patient's custom parametric 3D mesh model through a deformation transformation. The image to the left shows the generic template 3D mesh model (partially) annotated with target treatment points. The image to the right shows the template model "deformed" into the shape of the individual patient 3D mesh model where the transformed target treatment points are positioned through local coordinate interpolation on the mesh elements upon which the target location resides.

STEP 6: Deform the template 3D mesh model's shape into the patient's custom 3D mesh model's shape. A non-rigid body shape deformation is applied to each mesh element (e.g. triangular, quad, or chosen finite mesh element) to deform the chosen template 3D mesh model from Step 4 into the patient's custom 3D mesh model. The deformation transformations are constructed for each mesh element ek of the 3D mesh model (image shown at the left in FIG. 7), for example using an approach similar to that described in Anguelov, et al. ACM transactions on graphics (TOG), Vol. 24, pages 408-416. ACM, 2005. The non-rigid body motion matrix transforms is determined by solving the respective optimization problem as that prescribed in the deformed template 3D mesh model as the patient's custom 3D model annotated with the target treatment points (image shown at the right in FIG. 7).

STEP 7: Incorporate patient 3D mesh model into application program, e.g., an iOS or Android application program, with a recommender system. The clinician performs steps 4-6 on a device programmed to perform those steps to capture patient images and map the target trigger points onto the patient's custom 3D mesh models.

The application program can be further configured to allow the clinician to visualize the target treatment points directly on the patient's custom 3D mesh model on the device display, e.g., using Unity Pro. A machine learning-based recommender system may be enabled for suggesting target treatment points based on presented symptoms. For example, CC: Retro CP3 is associated with headache symptom; CF: Retro lateral pelvi 1 and 2 and retro lateral coxa are associated with sciatica. The application program can be configured to tabulate patient assessment and evaluation metrics as well as to allow the clinician to monitor patient progress in evaluating and recording a history of pre- and post-assessment of range of motion, strength test, coordination/balance, functional movement, and patient's pain level.

STEP 8: Implement an augmented reality-based application to superimpose the target treatment points from the custom 3D patient model projected onto the patient's body. The application program can be configured to allow the clinician to transform and visually align the custom 3D patient model with the patient and thereby superimposing, in real time, the target treatment points onto the patient's body when viewed through a display on the device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method comprising:
    selecting a template 3D musculoskeletal model from a library of template 3D musculoskeletal models based on one or more characteristics of a patient,
        wherein the template 3D musculoskeletal model comprises a plurality of target therapeutic locations distributed over an outer surface of the template 3D musculoskeletal model, and
        wherein the plurality of target therapeutic locations comprises at least one of a fascia center of coordination (CC) point, a fascia center of fusion (CF) point, an acupuncture point, or a trigger point;

generating an individual 3D musculoskeletal model of the patient using one or more two-dimensional (2D) images of the patient;

generating a custom 3D musculoskeletal model of the patient by merging the template 3D musculoskeletal model with the individual 3D musculoskeletal model, wherein the plurality of target therapeutic locations are superimposed on an outer surface of the custom 3D musculoskeletal model, wherein the outer surface corresponds to a skin surface of the patient; and displaying the custom 3D musculoskeletal model of the patient in real time such that the plurality of target therapeutic locations are visible on the outer surface of the custom 3D musculoskeletal model.

2. The method of claim 1, wherein the one or more characteristics of the patient comprises one or more of a gender, an age, or a body type of the patient.

3. The method of claim 1, wherein the target therapeutic locations have been subjectively marked on the template 3D musculoskeletal model by one or more experts.

4. The method of claim 1, wherein the target therapeutic locations have been automatically marked on the template 3D musculoskeletal model.

5. The method of claim 1, wherein generating a custom 3D musculoskeletal model of the patient by merging the template 3D musculoskeletal model with the individual 3D musculoskeletal model comprises deforming the template 3D musculoskeletal model to match a shape of the individual 3D musculoskeletal model.

6. The method of claim 5, wherein the template 3D musculoskeletal model and the individual 3D musculoskeletal model each comprise a 3D mesh model.

7. The method of claim 6, wherein the 3D mesh model comprises a plurality of finite elements.

8. The method of claim 7, wherein the plurality of finite elements of each 3D mesh model comprises a plurality of vertices and a plurality of mesh elements.

9. The method of claim 8, wherein deforming the template 3D musculoskeletal model to match the shape of the individual 3D musculoskeletal model comprises deforming each mesh element of the plurality of mesh elements of the 3D mesh model of the template 3D musculoskeletal model to match each respective mesh element of the plurality of mesh elements of the 3D mesh model of the individual 3D musculoskeletal model.

10. The method of claim 1, wherein the one or more 2D images comprise one or more full body images of the patient such that the fingers and toes of the patient are captured in the one or more full body images.

11. The method of claim 1 further comprising: manipulating a fascia of the patient at one or more target therapeutic locations corresponding to one or more target therapeutic locations of the plurality of target therapeutic locations visible on the custom 3D musculoskeletal model.

12. The method of claim 11, further comprising marking, before manipulating the fascia of the patient, one or more indicia on the skin surface of the patient indicating the one or more target locations corresponding to the one or more target therapeutic locations of the plurality of target therapeutic locations visible on the custom 3D musculoskeletal model.

13. The method of claim 1, wherein displaying the custom 3D musculoskeletal model of the patient in real time is performed using an application program.

14. The method of claim 1, further comprising recommending one or more target therapeutic locations of the plurality of target therapeutic locations to treat based on at least one symptom of the patient.

15. The method of claim 1, wherein each template 3D musculoskeletal model in the library is generated using one or more 2D images of a different subject.

16. The method of claim 15, wherein the different subject of each template 3D musculoskeletal model has a different combination of gender, age, and body type.

17. A method of treating a fascia of a patient, comprising:
(a) obtaining at least one two-dimensional (2D) image of the patient;
(b) generating an individual three-dimensional (3D) musculoskeletal model of the patient based on the at least one 2D image of the patient;
(c) selecting a template 3D musculoskeletal model based on one or more characteristics of the patient, wherein the template 3D musculoskeletal model comprises a plurality of target therapeutic locations corresponding to at least one of a fascia center of coordination (CC) point, a fascia center of fusion (CF) point, an acupuncture point, or a trigger point;
(d) generating a custom 3D musculoskeletal model based on the individual 3D musculoskeletal model and the template 3D musculoskeletal model such that the plurality of target therapeutic locations are mapped to the individual 3D musculoskeletal model;
(e) displaying the custom 3D musculoskeletal model in real time; and
(f) manipulating the fascia of the patient at one or more treatment locations that correspond to one or more target therapeutic locations of the plurality of target therapeutic locations on the displayed custom 3D musculoskeletal model.

18. The method of claim 17, wherein step (a) is performed using a smart phone or tablet comprising an application program.

19. The method of claim 18, wherein at least one of steps (b)-(e) are performed using the application program of the smart phone or tablet.

20. The method of claim 17, wherein the plurality of target therapeutic locations is superimposed on a skin surface of the individual 3D musculoskeletal model.

* * * * *